United States Patent [19]
Ozaki et al.

[11] Patent Number: 5,784,922
[45] Date of Patent: Jul. 28, 1998

[54] MOTOR FOR CONVERTING ROTATION OF A SHAFT TO LINEAR MOVEMENT

[75] Inventors: Shigeto Ozaki; Hironori Ito; Motonori Noda; Yuzuru Ikeda; Shinichi Kusakabe, all of Kariya, Japan

[73] Assignee: Kabushiki Kaisha Toyoda Jidoshokki Seisakusho, Kariya, Japan

[21] Appl. No.: 901,318

[22] Filed: Jul. 28, 1997

Related U.S. Application Data

[63] Continuation of Ser. No. 509,127, Jul. 31, 1995, abandoned.

[30] Foreign Application Priority Data

| Aug. 6, 1994 | [JP] | Japan | 6-204303 |
| Aug. 6, 1994 | [JP] | Japan | 6-204304 |

[51] Int. Cl.$^6$ .............. F16K 31/04; H02K 37/22
[52] U.S. Cl. .............. 74/424.8 VA; 74/89.15; 74/424.8 R
[58] Field of Search ............ 74/424.8 VA, 89.15, 74/424.8 R

[56] References Cited

U.S. PATENT DOCUMENTS

| 2,857,776 | 10/1958 | Williams et al. | 74/424.8 |
| 2,860,266 | 2/1958 | Schrader | 74/424.8 VA |
| 2,930,571 | 3/1960 | Vogl | 74/424.8 VA |
| 4,465,091 | 8/1984 | Keller | 74/424.8 VA |
| 4,483,512 | 11/1984 | Drapeau | 74/424.8 VA |
| 4,712,440 | 12/1987 | Rousselot | 74/89.15 |

FOREIGN PATENT DOCUMENTS

| 1043742 | 11/1958 | Germany. |
| 5913765 | 1/1986 | Germany. |
| 5913765 | 1/1984 | Japan. |
| 5988571 | 6/1984 | Japan. |
| 1169677 | 11/1989 | Japan. |
| 4231661 | 8/1992 | Japan. |

*Primary Examiner*—Charles A. Marmor
*Assistant Examiner*—David M. Fenstermacher
*Attorney, Agent, or Firm*—Brooks Haidt Haffner and Delahunty

[57] ABSTRACT

A motor includes a rotatable cylindrical rotor housed in a stator and has a female threaded nut formed inside the rotor. The motor has a male threaded screw shaft engaging with the nut. The rotation of the rotor is transformed to linear movement of the screw shaft by restricting the rotation of the screw shaft. A plurality of engaging sections project from the screw shaft. A contact section is provided with the rotor to contact with the engaging sections. The contact section contacts the engaging sections in accordance with the rotation of the rotor to restrict the rotation of the rotor and to prevent the screw shaft from releasing from the rotor.

9 Claims, 11 Drawing Sheets

Fig.12
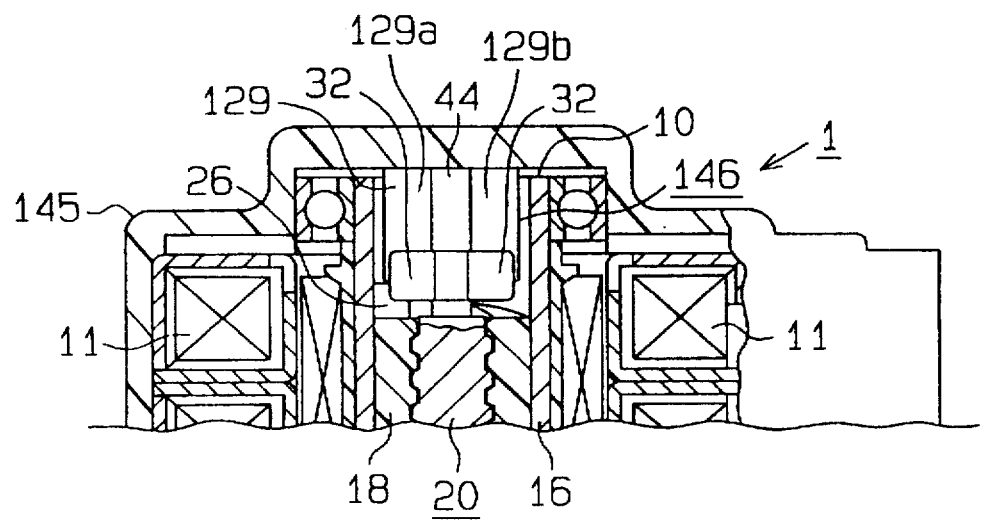
Fig.13(b)
Fig.13(a)
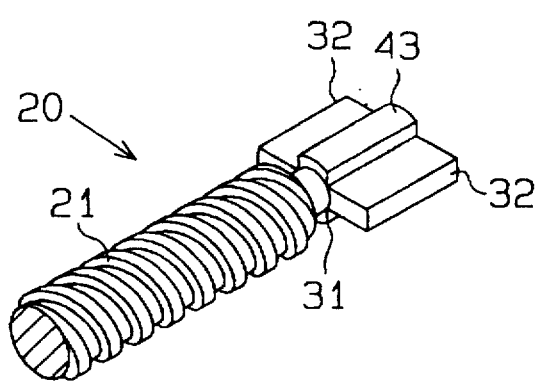

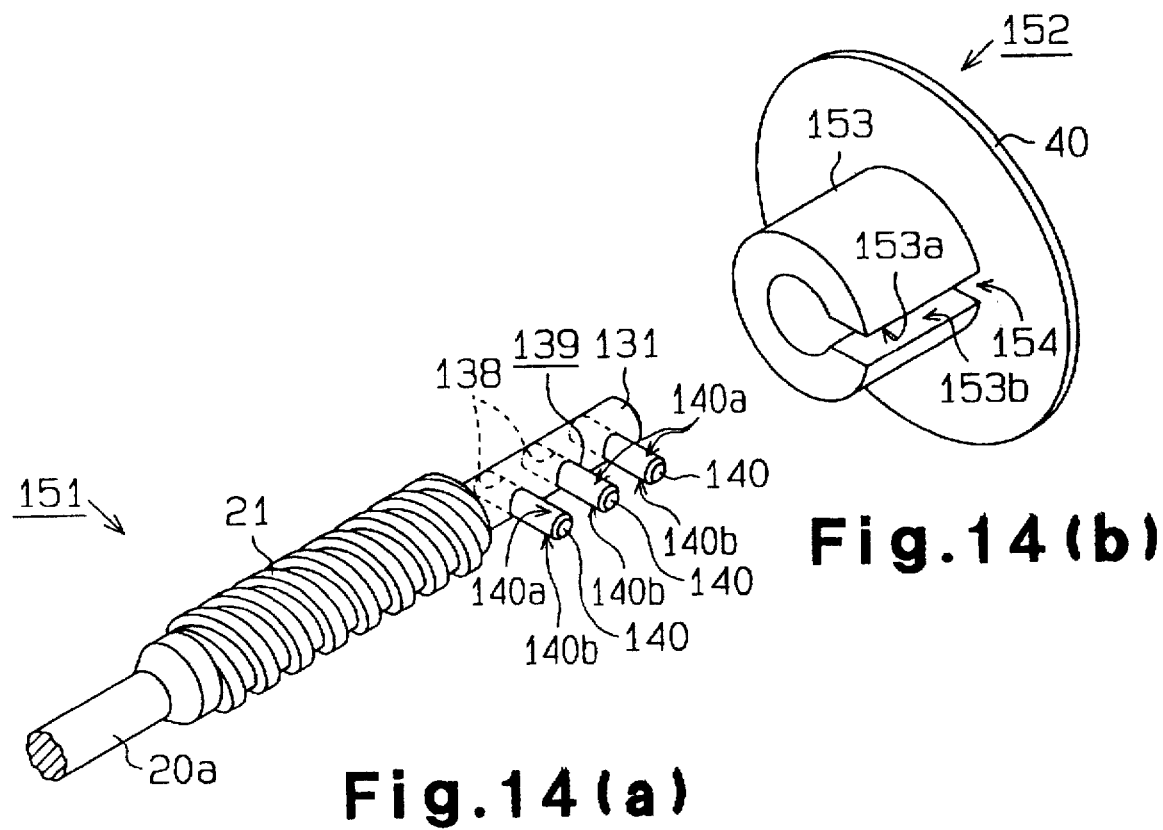
Fig.14(b)
Fig.14(a)
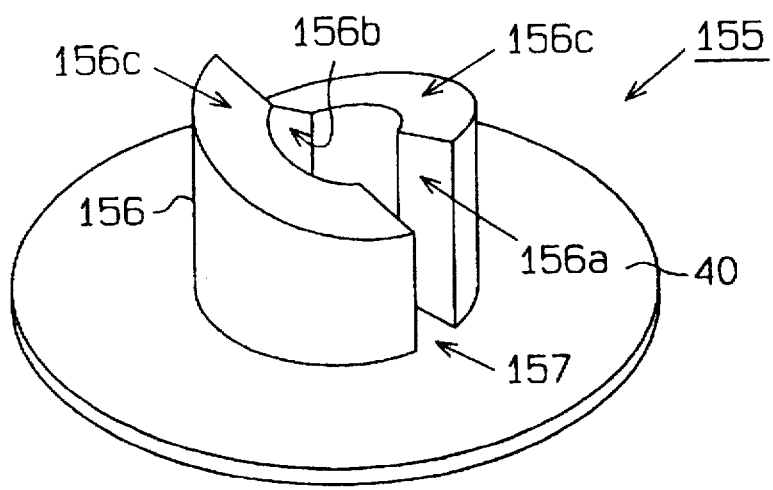
Fig.15

Fig.17(a) (Prior Art)
Fig.17(b) (Prior Art)
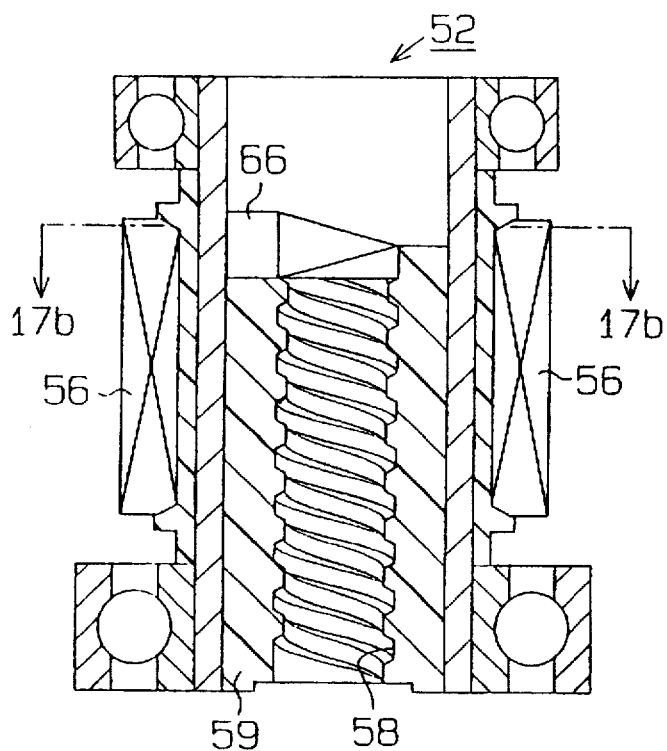
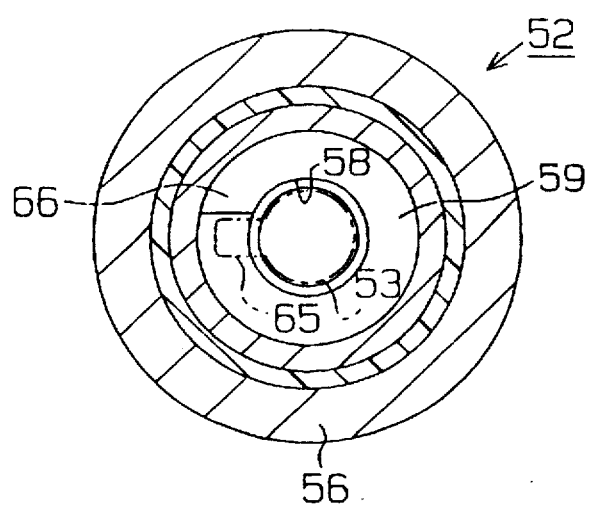
Fig.17(c) (Prior Art)
Fig.17(d) (Prior Art)
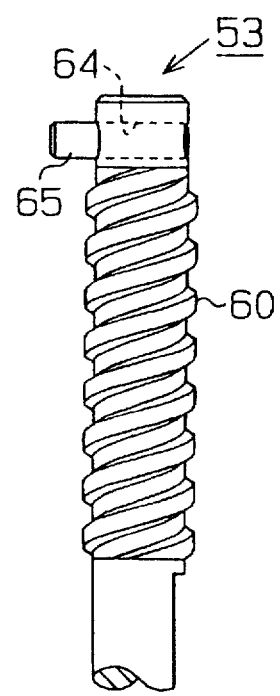
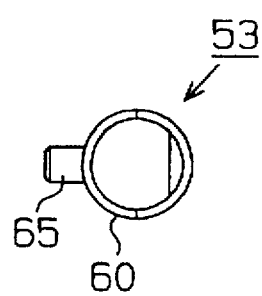

MOTOR FOR CONVERTING ROTATION OF A SHAFT TO LINEAR MOVEMENT

This application is a continuation, of application Ser. No. 08/509,127, filed Jul. 31, 1995, now abandoned.

BACKGROUND OF THE INVENTION

1. Field of the Invention

The present invention relates to a motor for converting rotation of a shaft to linear movement to be used, for example, in a motor driven type valve.

2. Description of the Related Art

An electric exhaust gas recirculation valve (hereinafter referred to as an EGR valve) for removing nitrogen oxides and the like contained in the exhaust gas of an automobile engine is an example of a device using a motor for converting the rotation of a shaft to linear movement. FIGS. 16 and 17 illustrate a conventional electric EGR valve 50. A description will be given of its construction and operation.

The electric EGR valve 50 is constituted by a stepping motor part 54 comprising a stator 51, a rotor 52, and a screw shaft 53, and a valve part 55 as shown in FIG. 16. The rotor 52 has a magnet 56 fixed on its outer peripheral surface and is rotatably accommodated in the stator 51, which has a stator coil 57. A lead nut 59 with a female thread portion 58 shown in FIGS. 17(a) and 17(b) is fixed on the inner peripheral surface of the rotor 52. The screw shaft 53 shown in FIG. 17(c) is screwed into the lead nut 59.

The screw shaft 53 is formed at its outer surface with a male thread portion 60 which engages with the female thread portion 58 of the lead nut 59. The lower end portion of the screw shaft 53, projecting from the male thread portion 60 toward the valve part 55, has a generally D-shaped cross-section. On the other hand, a bearing 63 supporting the screw shaft 53 is formed with a through hole having the same D-shaped cross section as the lower end portion of the screw shaft 53. Therefore, the screw shaft 53 is axially movable but cannot rotate with respect to the stator 51. On the lower end of the screw shaft 53 a valve body 62 is fixed and constitutes a valve together with a valve seat 61 provided in a reflux passage.

If the stator coil 57 of the EGR valve 50 is excited in sequence, then the rotor 52 will rotate over a predetermined angle in a predetermined direction. Since the screw shaft 53 is movable in a straight line but cannot rotate with respect to the stator 51, the rotation of the rotor 52 is converted to a linear movement of the screw shaft 53. As a result, projection distance of the screw shaft 53 from the stator 51 changes, and the valve is opened or closed according to that change.

In the case of the EGR valve 50, a pin 65 is fitted in a through hole 64 formed in the upper end of the screw shaft 53. A projection 66 is provided on the upper inner surface of the lead nut 59. Therefore, if the outer surface of the pin 65 is brought into contact with the side face of the projection 66, then the rotation of the screw shaft 53 will be stopped. At this time, the axial movement of the screw shaft 53 is stopped and at the same time, a reference position of the screw shaft is determined.

Also, in addition to this stop mechanism for the screw shaft 53, there is a technique disclosed, for example, in Japanese Unexamined Utility Model Publication No. 59-13765. In the valve of this Publication, release prevention and determination of a reference position are performed with the engagement between a pin fixed to part of a valve shaft and a stopper.

However, in the case of the conventional device having a release preventing mechanism as described above, the pin 65 abuts against the projection 66 at all times, so that if the device is used for a long period of time, the pin 65 or projection 66 will wear or will be deformed. In such case, the reference position of the screw shaft 53 is gradually shifted from its original position, so that it becomes difficult to accurately control the opening and closing of the valve body. In addition, the life of the entire device is reduced because of the wear or deformation of the pin 65 or projection 66.

SUMMARY OF THE INVENTION

The present invention has been made in order to solve the problems described above. Accordingly, it is an object of the invention to provide a direct-acting conversion motor which is capable of accurately controlling the movement of a screw shaft over a long period of time with enhanced durability.

To achieve the above object, a motor of the present invention includes a rotatable cylindrical rotor housed in a stator and has a female threaded nut formed inside the rotor. The motor has a screw shaft having a screw engaging with the nut. The rotation of the rotor is transformed to linear movement of the screw shaft by restricting the rotation of the screw shaft. A plurality of engaging sections project from the screw shaft. A contact section is provided with the rotor to contact with the engaging sections. The contact section contacts the engaging sections in accordance with the rotation of the rotor to restrict the rotation of the rotor and to prevent the screw shaft from releasing from the rotor.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 12 is a partial elevational sectional view showing an EGR valve of a sixth embodiment of the present invention;

FIG. 13(a) is a partial perspective view showing another screw shaft used with another rotation preventing member of the sixth embodiment;

FIG. 13(b) is a perspective view showing the rotation preventing member;

FIGS. 14(a) is partial perspective view showing a still another screw shaft of the sixth embodiment;

FIG. 14(b) is a perspective view showing another rotation preventing member;

FIG. 15 is a perspective view showing a still another rotation preventing member of the sixth embodiment;

FIG. 17(a) is a longitudinal sectional view showing a rotor with a screw shaft which is used in the conventional EGR valve of FIG. 16;

FIG. 17(b) is a cross-sectional view taken substantially along the line 17b—17b of FIG. 17(a);

FIG. 17(c) is a partial side view showing the screw shaft of FIG. 16; and

FIG. 17(d) is a bottom plan view of the screw shaft of FIG. 17(c).

DETAILED DESCRIPTION OF THE PREFERRED EMBODIMENTS

Figure 1:
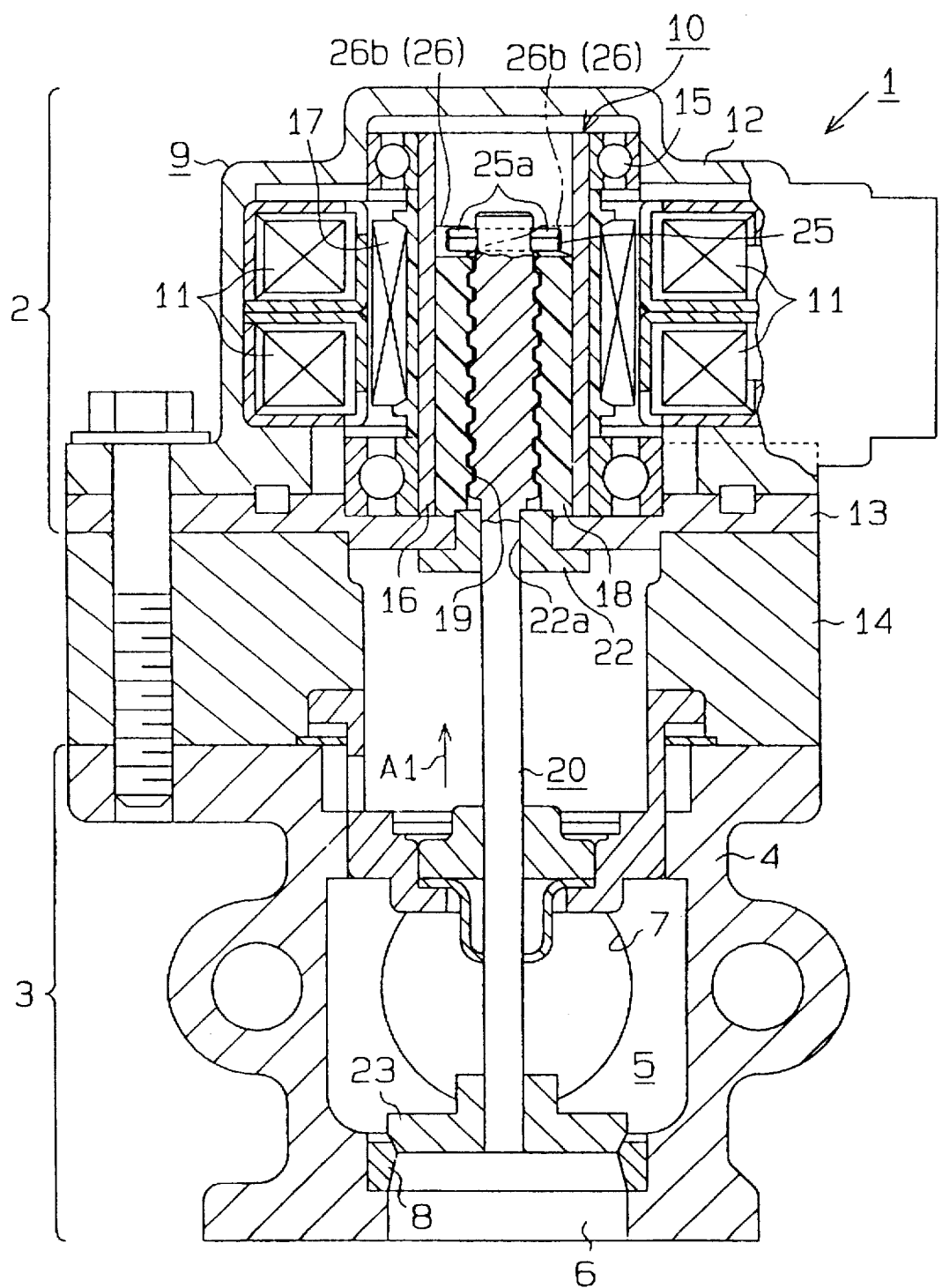
FIG. 1 is an elevational cross-sectional view showing an EGR valve according to a first embodiment of the present invention.

A preferred embodiment embodying an EGR valve of the present invention will hereinafter be described in detail with reference to FIGS. 1 and 2.

An EGR valve 1 is a device that is used in an EGR system which recirculates exhaust gas containing imperfect combustion gas exhausted from an automobile engine and the like, to a suction unit to reduce harmful components such as nitrogen oxides. In general EGR systems, the EGR valve 1 is arranged in an exhaust gas refluxing passage to control a quantity of EGR in response to the operating state of the engine, for example, the degree of the opening of a throttle valve.

First, the entire structure of the EGR valve 1 will be described. This EGR valve 1 comprises a stepping motor part 2 and a valve part 3, as shown in FIG. 1. The housing 4 of the valve part 3 is provided with a reflux passage 5. The reflux passage 5 is formed at its one end with an inlet port 6 communicating with the exhaust system of the engine and at its other end with an outlet port 7 communicating with the suction system of the engine. Therefore, the exhaust gas that is exhausted from the engine passes through the inlet port 6, the reflux passage 5, and the outlet port 7 and again returns to the suction system. Also, a valve, formed by a valve seat 8 and a valve body 23, regulating the flow of exhaust gas, is arranged in the middle of the reflux passage 5.

The stepping motor part 2, as shown in FIG. 1, is constituted by a stator 9, a rotor 10, and a screw shaft 20. A motor housing 12 and cover member 13 on the stator side (9) are connected to the valve housing 4 through a coupling housing 14. A stator coil 11 is provided in the interior space defined by the motor housing 12 and the cover member 13. Further, the rotor 10 is rotatably accommodated in that interior space through bearings 15.

Figure 2A:
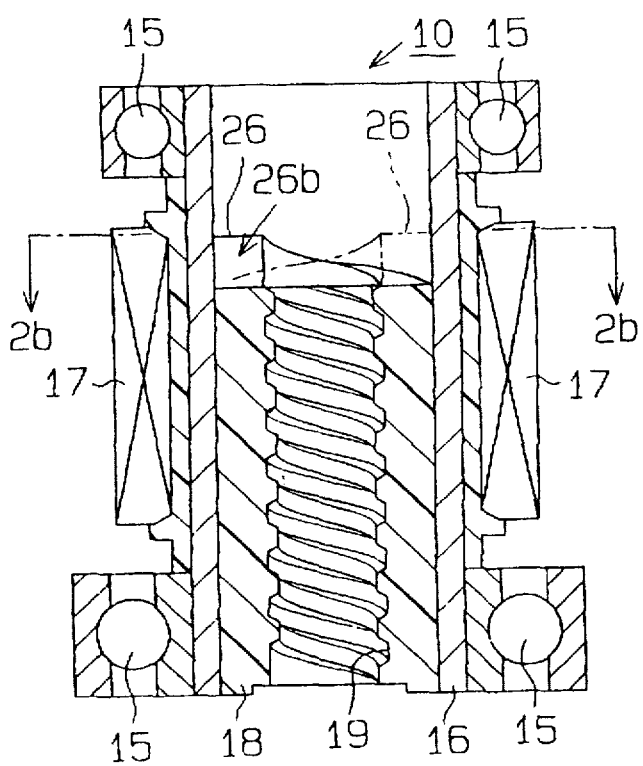
FIG. 2(a) is a cross-sectional view showing a rotor for receiving a screw shaft which is used in the EGR valve of FIG. 1.
Figure 2C:
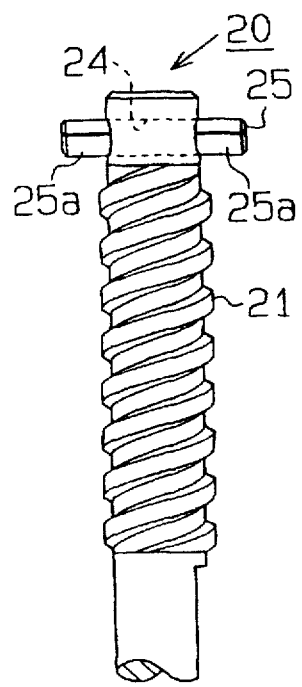
FIG. 2(c) is a partial side view showing the screw shaft of FIG. 1.
Figure 2B:
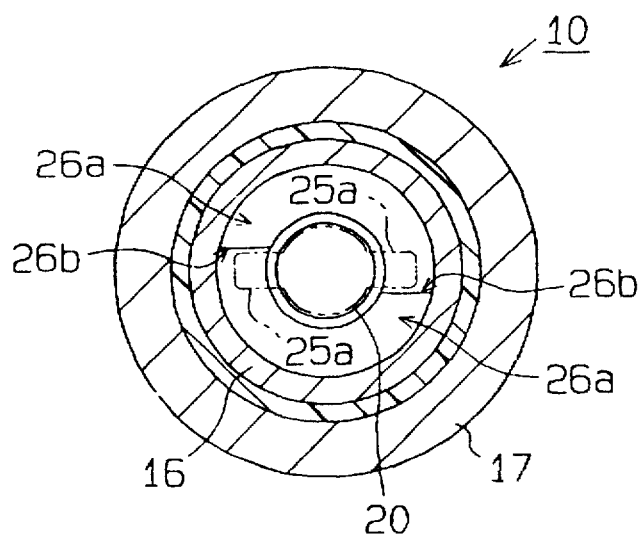
FIG. 2(b) is a cross sectional view taken substantially along the line 2b—2b of FIG. 2(a)

As shown in FIGS. 2(a) and 2(b), a sleeve 16 of the rotor 10 is formed of a nonmagnetic material into a cylindrical hollow shape. A magnet 17 magnetized to multiple poles is firmly fitted on the outer peripheral surface of the sleeve 16 in correspondence with the above-described stator coil 11. To the inner peripheral surface of the sleeve 16, there is fixed a cylindrical resinous lead nut 18. The lead nut 18 is formed with a hole passing through its center, and female threads 19 are formed in the central portion. The sleeve 16, magnet 17, and lead nut 18 rotate as one rotor 10.

Figure 2D:
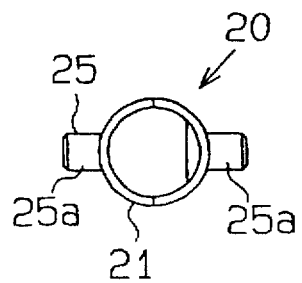
FIG. 2(d) is a bottom plan view of the screw shaft of FIG. 2(c)

As shown in FIG. 1, a metallic screw shaft 20 is screwed into the lead nut 18. As shown in FIG. 2(c), this screw shaft 20 has male threads 21 formed on its outer peripheral surface which engage with the female threads 19 of the lead nut 18. In FIG. 1, the lower end portion of the screw shaft 20 penetrates the cover member 13 and projects into the valve part 3. The portion of the screw shaft 20 below the thread portion 21 is shaped so that it has a generally D-shaped cross section, as shown in FIG. 2(d). The cover member 13 has mounted therein a bearing 22 containing a lubricating oil.

The bearing 22 is provided with a through hole 22a having a generally D-shaped cross section corresponding to the shape of the cut-out portion. The screw shaft 20 is supported by the bearing 22 so that it is axially movable but cannot rotate. The lower end portion of the screw shaft 20 extends into the reflux passage 5 of the valve housing 4. That lower end portion supports the valve body 23, which forms a poppet valve, together with the above-described valve seat 8. The valve body 23 is arranged in proximity to the valve seat 8. The release preventing mechanism of the screw shaft 20 will now be described. As shown in FIG. 2(c), a circular through-hole 24, which extends diametrically, is formed in the upper portion of the screw shaft 20 above the male thread portion 21. A spring pin 25 having a circular cross-section with a slit is inserted into the through hole 24 so that the opposite ends of the pin 25 project from the hole 24. That is, in this embodiment, the opposite ends of the spring pin 25, provided separately from the screw shaft 20, constitute engaging projections 25a. This spring pin 25 is one where a spring steel plate is bent in the form of a cylinder. The spring pin 25 is clamped by a clamping tool (not shown) so that the diameter is reduced, and in that state, it is inserted into the through hole 24. After the clamping force of the tool is released, the pin 25 is fixed within the through hole 24 by its spring force.

On the other hand, two projections 26 and 26 as engaged members are formed on the upper end face of the lead nut 18, as shown in FIGS. 2(a) and 2(b). These engaged members 26 and 26 are arranged on diametrically opposite sides of the lead nut 18 with the axis of the lead nut 18 therebetween. Each engaged member 26 has an inclined surface 26a and an engaged surface 26b extending along the axial direction of the lead nut 18. The height of each of the engaged projections 26 is set to be slightly shorter than a distance that the screw shaft 20 moves in a straight line when the rotor 10 rotates one revolution.

FIG. 1 shows the state where the valve seat 8 has been closed by the valve body 23 and also where the engaging projections 25a have been brought into contact with the engaged surfaces 26b of the engaged members 26. At this time, the engaging projections 25a of the screw shaft 20 engage with the inclined surfaces 26a of the lead nut 18 as well. As a result, the engaging projections 25 are supported upward by the inclined surfaces 26 and thus, the screw shaft 20 is prevented from moving downward. If the rotor 10 rotates one revolution in a valve-opening direction, then the engaging projections 25a will move upward along the inclined surfaces 26a while moving away from the engaged surfaces 26b. Consequently, the screw shaft 20 moves upward, the valve body 23 is moved away from the valve seat 8, and the valve is opened. After this movement of the screw shaft 20, the engaging projections 25a are supported on the upper surfaces of the engaged members 26.

The above-described mechanism is assembled in the following order. First, the sleeve 16, magnet 17, lead nut 18, and bearings 15 are assembled into the rotor 10, as shown in FIG. 2(a). Then, the screw shaft 20 is inserted from the top into the lead nut 18 and is rotated until the engaging projections 25a are brought into contact with the engaged surfaces 26b. After the rotation of the screw shaft 20 is stopped with the contact between the engaging projections 25a and the engaged surfaces 26b, the cover member 13 is attached while the screw shaft 20 is being inserted through the through hole 22a. The valve body 23 is then attached to the lower end of the screw shaft 20. Thereafter, the rotor 10 is received in the motor housing 12.

Now, the operation of the EGR valve 1 will be described. A computer provided outside the EGR valve 1, in addition to sending the above-described degree of opening of the throttle valve, sends predetermined electric signals, based on the vehicle velocity, the engine speed, and the engine temperature, which represent the operating conditions of the engine. The computer sends one of these electric signals to the stepping motor part 2 to excite the stator coil 11. According to the electric signal supplied, the rotor 10 is intermittently rotated in its forward or backward direction by a predetermined angle.

If the rotor 10 is rotated in the counterclockwise direction, as viewed in the direction of the arrow A1 of FIG. 1, then the screw shaft 20 will be moved upward by the feed screw mechanism, and the engaging projections 25a of the screw shaft 20 will be moved away from the engaged surfaces 26b of the engaged members 26. As a consequence, the valve body 23 on the screw shaft 20 is gradually moved away from the valve seat 8, the valve is opened, and the quantity of recirculation of exhaust gas is increased.

On the other hand, if the rotor 10 is rotated, in the state where the valve is opened as described above, in the clockwise direction viewed in the direction of arrow A1 of FIG. 1, then the screw shaft 20 will be moved downward by the feed screw mechanism, and the engaging projections 25a of the screw shaft 20 will be brought into contact with the engaged surfaces 26b of the engaged projections 26. As a consequence, the valve body 23 on the screw shaft 20 is moved toward the valve seat 8, the valve is closed, and the quantity of recirculation of exhaust gas is reduced. Thus, the valve is opened or closed according to the range that the screw shaft 20 is projected from or retracted into the stator 9, so that a quantity of recirculation of exhaust gas can be controlled to an appropriate value.

Also, in the state where the valve is open, when the rotor 10 rotates one revolution in the clockwise direction, the engaging projections 25a are brought into contact with both the engaged surfaces 26b at the same time. At this time, the engaging projections 25a are held on the inclined surfaces 26a. As a result, the rotation of the rotor 10 is regulated and also the downward movement of the screw shaft 20 is regulated. In this state, the screw shaft 20 is held in its reference position shown in FIG. 1, and the valve is in its most tightly closed state.

As described above, in this embodiment, two engaged surfaces 26b are provided on the lead nut 18 side for the engaging projections 25a. Therefore, the impact as both engaging projections 25a are brought into contact with the engaged surfaces 26b is reduced by about 50% as compared with a conventional device having only one engaging projection. As a result, the wear and deformation of the spring pin 25 and engaged members 26 are suppressed, and any shift in the reference position of the screw shaft 20 will be reduced or eliminated. This makes accurate opening and closing of the valve possible over a long period of time and enhances the durability of the device.

In addition, the spring pin 25 and the screw shaft 20 are formed separately. Therefore, even if the spring pin 25 wears or is deformed, it can be replaced. Thus, the screw shaft 20 can be repaired without exchanging the entire screw shaft. Moreover, two engaging projections 25a can be formed using one spring pin 25, so that the structure is relatively simple. In addition to this, since the spring pin 25 has elasticity, it is unlikely to shift or fall from the through hole 24.

Further, in this embodiment, the spring pin 25 and the projections 26 are provided above the male thread portion 21 of the screw shaft 20. For this reason, when assembling the rotor 10, the screw shaft 20 can be screwed from the upper end side of the lead nut 18. Whereas, if the engaging projections 25a are provided in the lower side of the male thread portion 21, it will become necessary to screw the screw shaft 20 into the lead nut 18 and then fit the spring pin 25 into the through hole 24, and these operations will be troublesome. That is, location of the spring pin 25 on the upper end of the screw shaft 20 will be more advantageous in ease of assembly.

In addition, in this embodiment, the release preventing mechanism of the screw shaft 20 also serves as a mechanism for determining the reference position of the screw shaft 20. Therefore, unlike the case where this structure was not adopted, it is unnecessary that a release preventing mechanism be provided on the lower side of the screw shaft 20, for example, in the cover member 13. Hence, this embodiment is advantageous from the standpoint of the simplification of structure as well as the ease of assembly.

Now, a release preventing mechanism for the screw shaft of a second embodiment of the present invention will be described with reference to FIG. 3. A screw shaft 30 in this embodiment is different in structure from the screw shaft 20 of the first embodiment. However, the remaining parts do not differ basically from those of the first embodiment and therefore a detailed description is omitted.

Figure 3A:
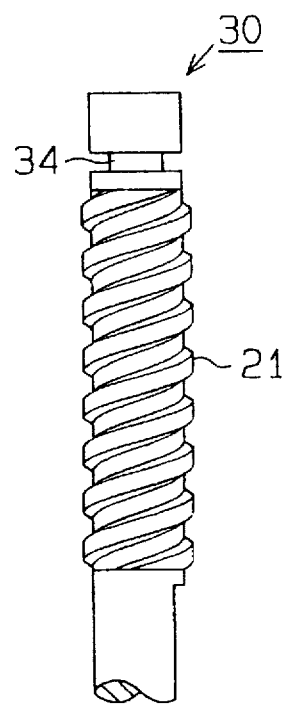
FIGS. 3(a) and 3(c) are partial side views showing the manufacturing procedure of a screw shaft used in an EGR valve of a second embodiment of the present invention.
Figure 3B:
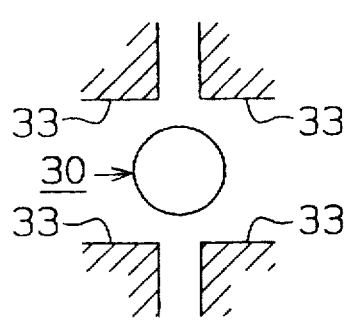
FIGS. 3(b) and 3(d) are schematic top plan views of the screw shafts of FIGS. 3(a) and 3(c), respectively.
Figure 3C:
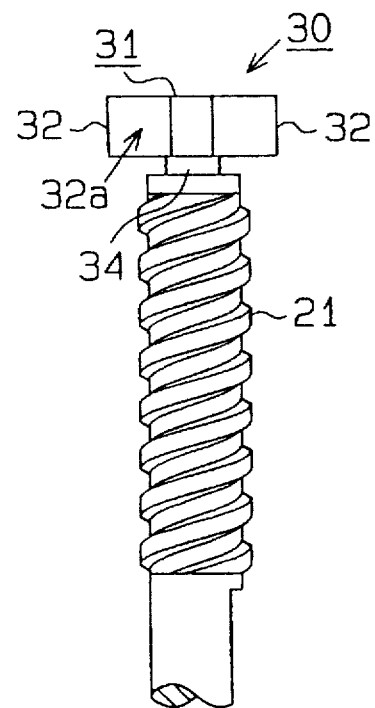
Figure 3D:
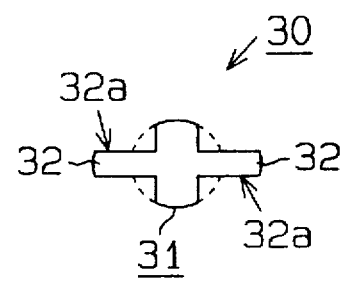

As shown in FIGS. 3(c) and 3(d), the screw shaft 30 has at its upper end a pressed portion 31 formed integrally by upsetting or swaging. The pressed portion 31 is provided with two wing-shaped projections 32 as engaging projections. These projections 32 are arranged in positions of symmetry with respect to the axis of the screw shaft 30. Also, these projections 32 have pressed surfaces 32a parallel to the axial direction of the screw shaft 30.

Upsetting or swaging refers to work methods where compression molding is performed with a metallic material arranged in a mold, and includes hot forging, warm forging, cold forging, and the like.

When the projections 32 of the screw shaft 30 are to be formed as shown in FIGS. 3(c) and 3(d), compression molding is performed with the upper end of the shaft 30 fixed between four molds 33. Then, the upper portion above the constricted portion 34 of the shaft 30 is plastically deformed and, consequently, the projections 32 are formed.

According to the structure described above, the pressed surfaces 32a of the projections 32 will be brought into surface contact with the engaged surfaces 26b of the members 26 at the same time if the rotor 10 is rotated in the clockwise direction. As a result, the rotation of the rotor 10 is regulated. Also, since both projections 32 engage with the inclined surfaces 26a, the downward movement of the screw shaft 30 is regulated. In addition, the position of the screw shaft 30 is set to its reference position.

This embodiment has the characteristic that the surface 32a and the engaged surface 26b surface-contact each other. Therefore, surface pressure to be exerted on the engaged projection 26 is smaller in this embodiment than in the first embodiment where the opposite end portions 25a of the spring pin 25 and the engaged surfaces 26b make line-contact with each other. As a result, deformation and wear of the projections 32 and engaged members 26 are reduced. Hence, the second embodiment, as compared with the first embodiment, can accurately open and close the valve over a longer period of time, and moreover, the durability of the device is enhanced. Particularly, in this embodiment where the projections 32 are formed by upsetting or swaging, the projections 32 have a relatively high hardness and are difficult to deform.

Also, since pressure is evenly applied, at the time of swaging, to the screw shaft 30, the surfaces 32a are formed precisely. In addition, since the influence of strain produced during swaging is prevented by the constricted portion 34, strain is prevented from occurring in the male thread portion 21 of the screw shaft 30. This is advantageous when achieving the accurate opening and closing control of the valve.

Further, the formation of the through hole 24 (FIG. 2(c)) in the screw shaft 30 and the insertion of the spring pin 25 into the screw shaft 30 are unnecessary in this embodiment. For this reason, there is the advantage that the assembly of the screw shaft 30 is easy and less costly. Also, one of the reasons for providing, on the upper end side of the screw shaft 30, the pressed portion 31 and engaged members 26 which constitute the release preventing mechanism, is for easy assembly.

Now, the release preventing mechanism of a screw shaft of a third embodiment will be described with reference to FIGS. 4 and 5. The points different from those in the screw shaft 20 of the first embodiment will mainly be described, the same reference numbers are applied to the same parts, and a description of the same parts is omitted.

In the first and second embodiments, there has been a rotation preventing structure adapted that comprises a screw shaft 20 or 30 having a generally D-shaped cross section and a bearing 22 having the through hole 22a of the same D-shaped cross section. In contrast, in the EGR valve 36 of this embodiment, there is adopted a rotation preventing structure which comprises a rotation preventing member 37 shown in FIG. 5(c) and a screw shaft 38 similar to the structure of the second embodiment. Therefore, the through hole 39a of a bearing 39 has a generally circular cross section, and as shown in FIG. 5(a), the screw shaft 38 with a generally circular cross section is used.

Figure 4:
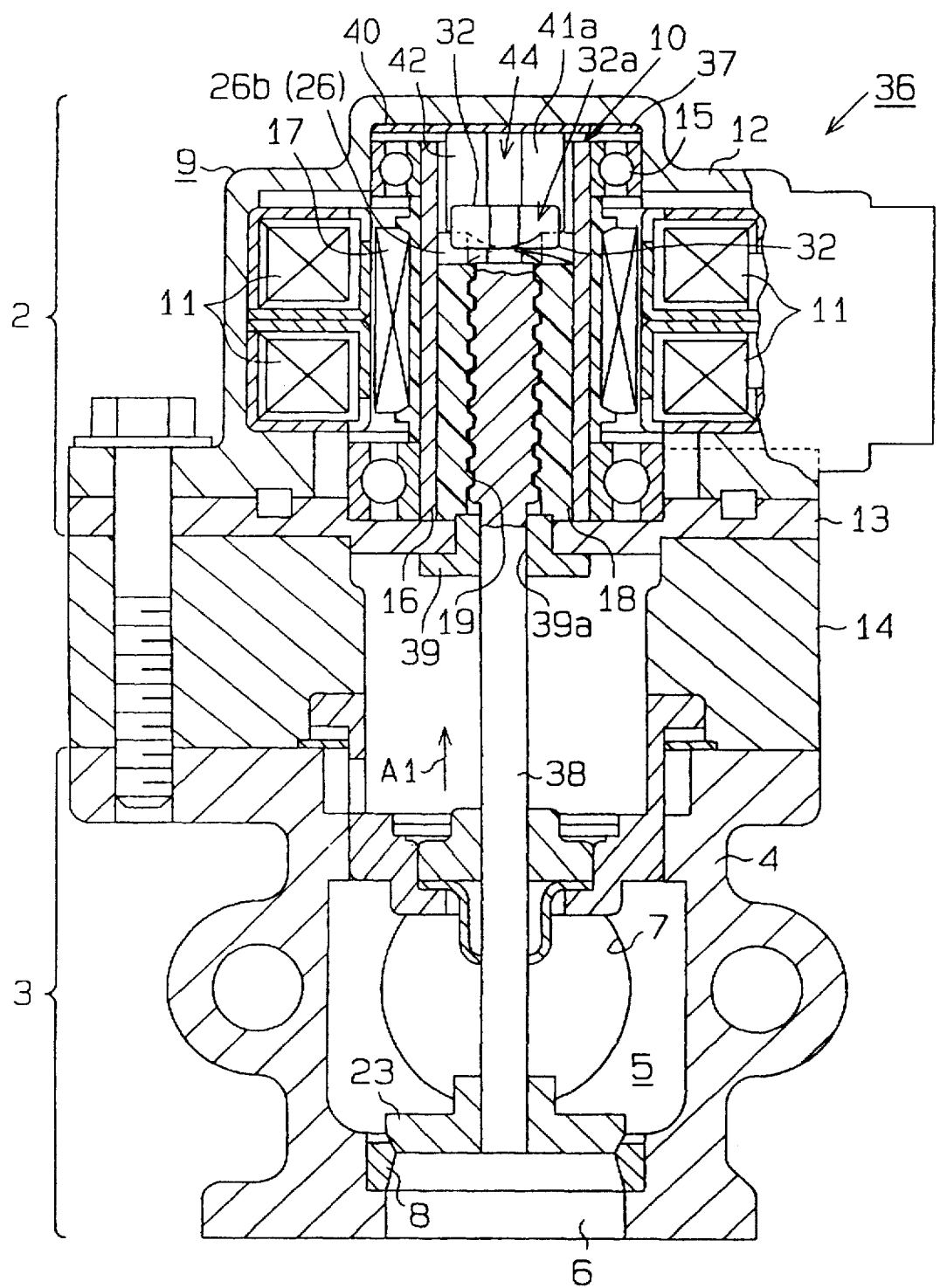
FIG. 4 is an elevational cross-sectional view showing an EGR valve of a third embodiment of the present invention.
Figure 5A:
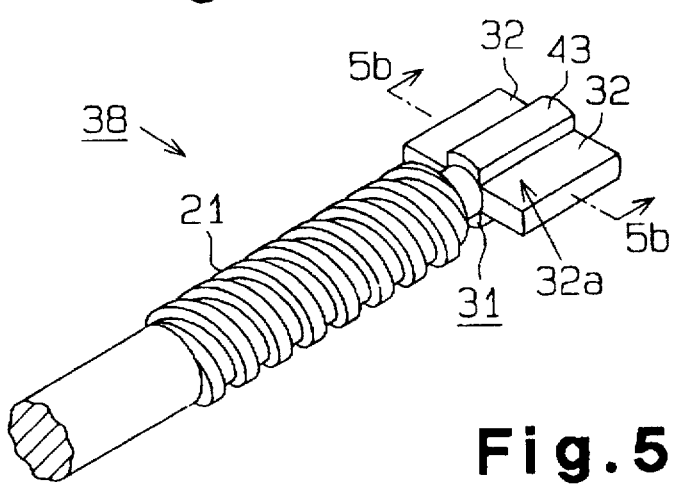
FIG. 5(a) is a partial perspective view showing the screw shaft used in the EGR valve of FIG. 4.
Figure 5B:
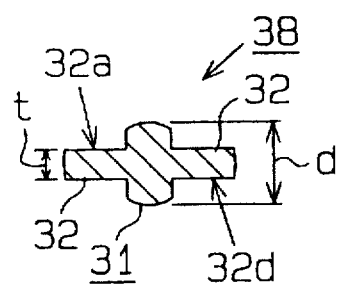
FIG. 5(b) is a cross-sectional view taken substantially along the line 5b—5b of FIG. 5(a)
Figure 5C:
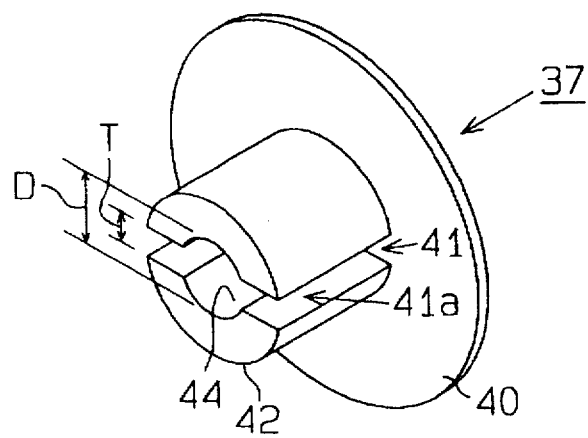
FIG. 5(c) is a perspective view showing the rotation preventing member of FIG. 4.

The rotation preventing member 37, as shown in FIG. 5(c), comprises a circular base plate 40 and a cylindrical projection 42 having two slits 41. This rotation preventing member 37 is formed, for example, of a copper type oil-containing sintered metal. The inner surfaces of the projection 42 forming the slits 41 form guide surfaces 41a, which are longer than the straight distance that the screw shaft 38 moves. As shown in FIG. 4, the rotation preventing member 37 is fixed to the upper portion of a motor housing 12, with the projection 42 pointing downward. The member 37 is mounted coaxially to and above the shaft 38.

As shown in FIGS. 5(a) and 5(b), a pressed portion 31 with two projections 32 is formed in the upper end of the screw shaft 38 by upsetting or swaging. The projections 32 of the third embodiment are two times longer in axial length than those of the second embodiment. The width of the slit 41, T, is slightly greater than the thickness, t, of the projection 32, as shown in FIGS. 5(b) and 5(c). Also, the diameter, D, of a central hole 44 guiding the axial portion 43 of the pressed portion 31 is slightly greater than the diameter, d, of the axial portion 43. Therefore, the projections 32 formed at the upper end of the screw shaft 38 are vertically slidable along the slits 41.

The rotation preventing mechanism of the third embodiment is assembled in the following order. First, a rotor 10 is assembled and then the screw shaft 38 is screwed from the top of the lead nut 18. The screw shaft 38 is rotated until the projections 32 are brought into contact with engaged surfaces 26b. Thereafter, the screw shaft 38 is inserted through the through hole 39a of the bearing 39, and a cover member 13 is attached. A valve body 23 is then attached to the lower end of the screw shaft 38. The rotor 10 is accommodated in the motor housing 12. At this time, the position of the rotation preventing member 37 with respect to the motor housing 12 is adjusted so that the projections 32 are aligned with the slits 41.

In the third embodiment, shown in FIGS. 4 and 5, in addition to the same reference position as in the second embodiment being determined, the projections 32 of the screw shaft 38 engage with the slits 41 of the rotation preventing member 37. The rotation of the screw shaft 38, therefore, is regulated at any position on the straight movement stroke of the screw shaft 38. As a result, the prevention of rotation of the screw shaft 38 is accomplished.

Since the projections 32 and the guide surfaces 41a will contact each other surface to surface, the friction between the rotation preventing member 37 and the screw shaft 38 will be small. In addition, the troublesome machining of the shaft 38 becomes unnecessary, and the procedure for removing the deformation or burr on the shaft produced during the machining process becomes unnecessary. As a result, a reduction in process cost and an increase in manufacturing efficiency can be achieved. Also, there are no milling lines and burrs which cause an increase in sliding resistance, so that the frictional resistance between the shaft and the bearing is small. Consequently, a reduction in the load torque of the motor, downsizing of the motor, enhancement of durability, and a reduction of the number of inaccurate operations is achieved.

Figure 6:
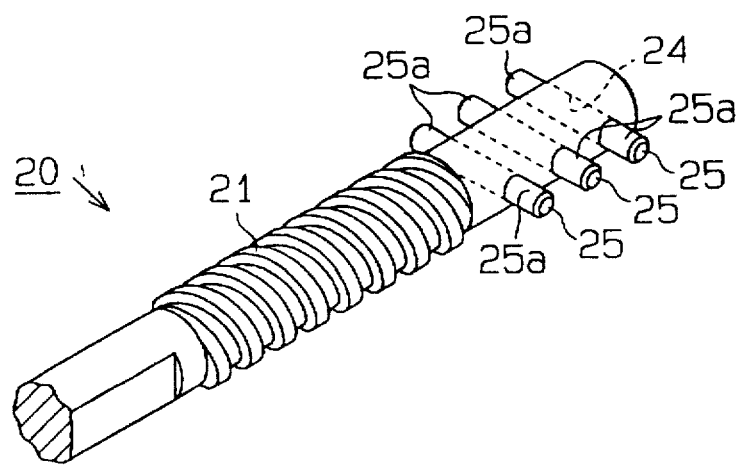
FIG. 6 is a partial perspective view showing another screw shaft of the third embodiment of the present invention.

Note that the present invention can be modified as follows. As shown in FIG. 6 and in the first embodiment, a plurality of through holes 24 may be formed in the upper end portion of the screw shaft 20, and a plurality of spring pins 25 may be inserted into the through holes 24. If the screw shaft is formed in this way, the number of places where the spring pins 25 engage with the engaged surfaces 26b will be increased. Thus, the impact of each is smaller.

Instead of the through hole 24 of the first embodiment, a plurality of holes having a depth reaching the vicinity of the center axis of the screw shaft, for example, may be bored, and the spring pins 25 may be inserted into the holes so that part of each pin projects from the hole. If the shaft is designed in this manner, three or more engaging projections 25a will be able to be used, and it will be possible to set the angle between the engaging projections 25a to an arbitrary angle other than 180 degrees.

Figure 7:
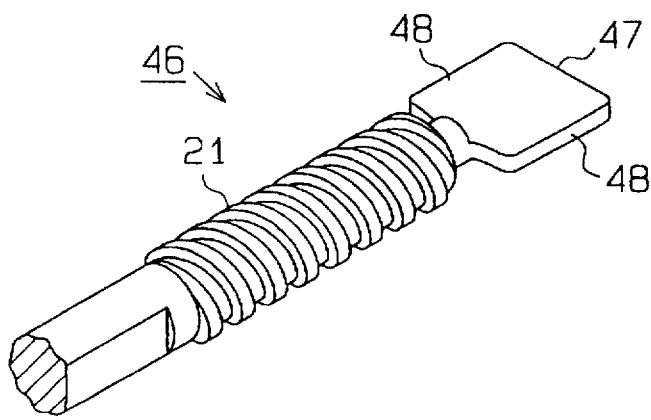
FIG. 7 is a partial perspective view showing still another screw shaft of the third embodiment of the present invention.

In another embodiment, a screw shaft 46 as shown in FIG. 7, has a pressed portion 47 with a flat shape. The sides thereof may be used as projections 48 serving as engaging projections.

Also, the present invention is not limited to upsetting or swaging as the method of forming the end of the screw shaft. The projections 32 or 48 can also be cast at the same time as the casting of the male thread portion 21.

In the second and third embodiments, the number of projections 32 that are provided in the pressed portion 31 may be three or more. If the number of projections 32 is increased, the surface pressures to be applied to each projection 32 and each engaged surface 26b will be further reduced, and wear and deformation will be reduced accordingly.

In the first embodiment, the engaged surface of the engaged projection 26 may be provided with a concave surface corresponding to the curvature of the spring pin 25. Then, the spring pin 25 could make surface to surface contact with the engaged surface 26b.

In the first embodiment, it is preferable that a flat surface be provided in the outer surface of the spring pin 25 by forming the cross section of the spring pin 25 into a semicircular or square shape. With this structure, the wear and deformation of the engaged surface 26b can be reduced.

The screw shafts 20, 30, 38, and 46, and the lead nut 18 may be formed of a hard material such as ceramic. Also, these are not always hardened as a whole. For example, at least the contacting portion may be coated with a hard film such as metal or ceramic.

It is sufficient that the place where the engaged projection 26 is formed is on the side of the rotor 10, i.e., on the side of a rotating member. Thus, a plurality of engaged surfaces may be formed by bending, for example, part of the wall portion of the sleeve 16 inwardly.

Instead of the valve arrangement of the first to third embodiments, the valve body 23 may be arranged on lower side of the valve seat 8, i.e., on the inlet port (6) side of the reflux passage 5.

The pin used in the first embodiment is not limited to the spring pin 25. An appropriate pin other than the pin 25 may be press fitted into the through hole 24.

Also, in the third embodiment, the projection 32 may be formed of another member and fixed to the screw shaft 38 by press fitting, welding, or bonding. Further, the projection 32 may be formed of a resin, and thereafter, it may be fixed to the screw shaft 38 by outsert molding.

Now, a rotation preventing mechanism, constructed in accordance with a fourth embodiment of the present invention, will be described with reference to FIG. 8. A rotation preventing member 135 of this embodiment is slightly different in structure from the rotation preventing member 37 of the third embodiment (FIG. 4). The parts other than the rotation preventing member 135 are basically the same as the third embodiment. Therefore, a detailed description is omitted.

Figure 8A:
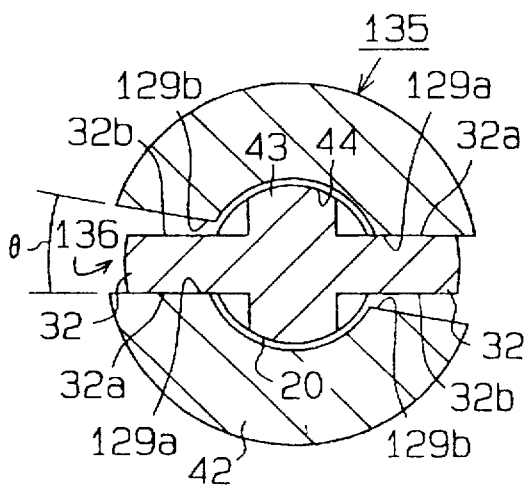
FIGS. 8(a) and 8(b) are cross-sectional views showing a rotation preventing mechanism of a fourth embodiment of the present invention.
Figure 8B:
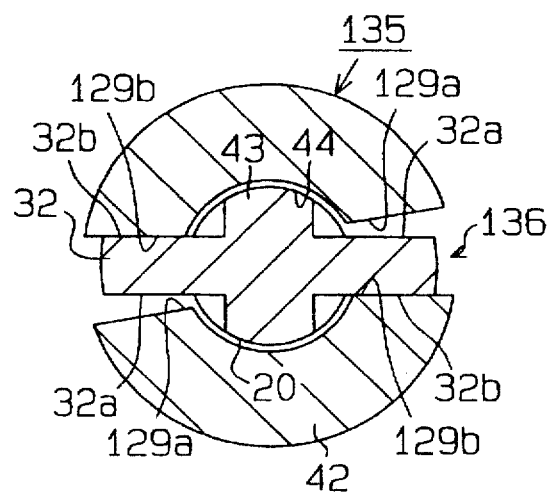

In the rotation preventing member 135 of this embodiment shown in FIGS. 8(a) and 8(b), a slit 136 is formed so that a first guide surface 129a and a second guide surface 129b opposing to each other form a predetermined angle θ. Note that in FIGS. 8(a) and 8(b), the slit 136 is shown on an enlarged scale.

In the above-described structure, if a rotor 10 is rotated in its forward direction, the first guide surface 129a will almost contact all of a first surface 32a, as shown in FIG. 8(a), and therefore the rotation of a screw shaft 20 will be regulated.

Likewise, if the rotor 10 is rotated in the backward direction, the second guide surface 129b will contact nearly all of a second surface 32b, as shown in FIG. 8(b), and therefore the rotation of the screw shaft 20 will be regulated. Thus, since almost perfect surface to surface contact can be achieved, the surface pressure in this embodiment can be made smaller per unit area than that of the third embodiment. Therefore, a reduction in the load torque of the motor and downsizing of the motor can be achieved.

Figure 10:
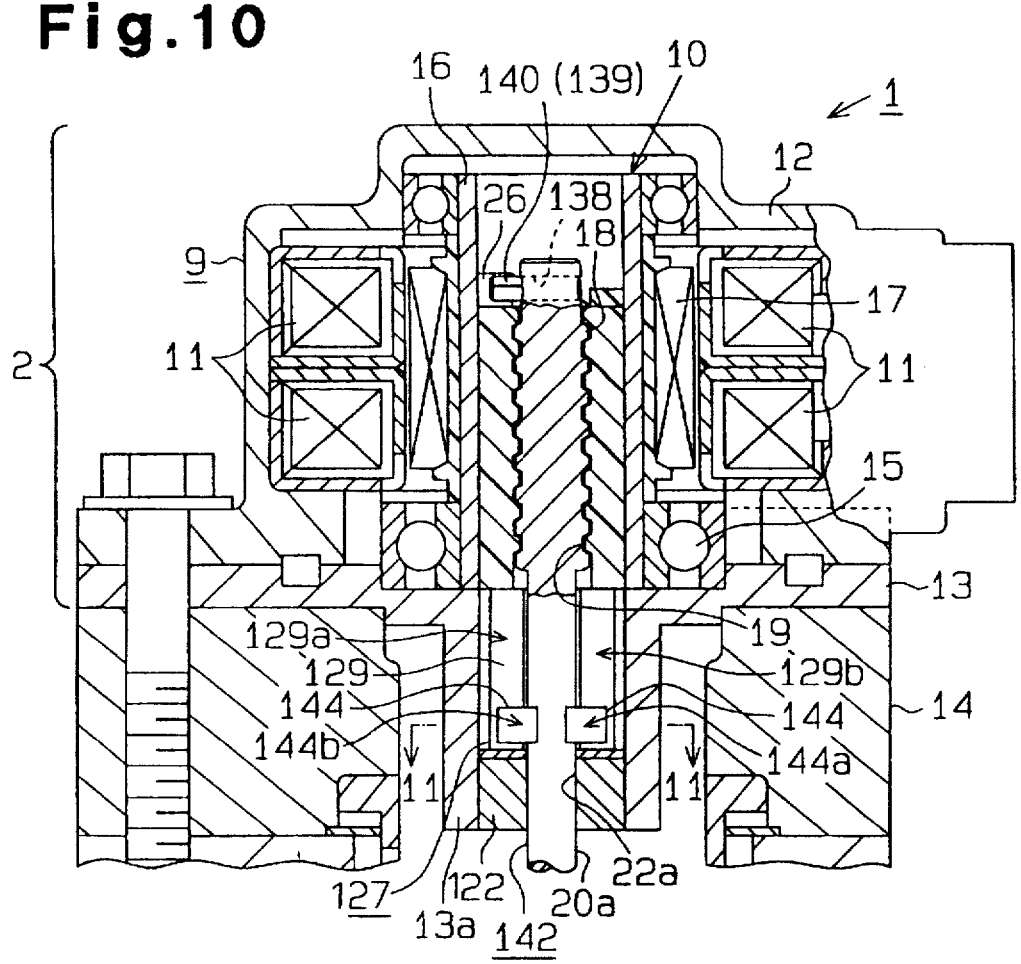
FIG. 10 is a partial elevational sectional view showing an EGR valve of the fifth embodiment.
Figure 11:
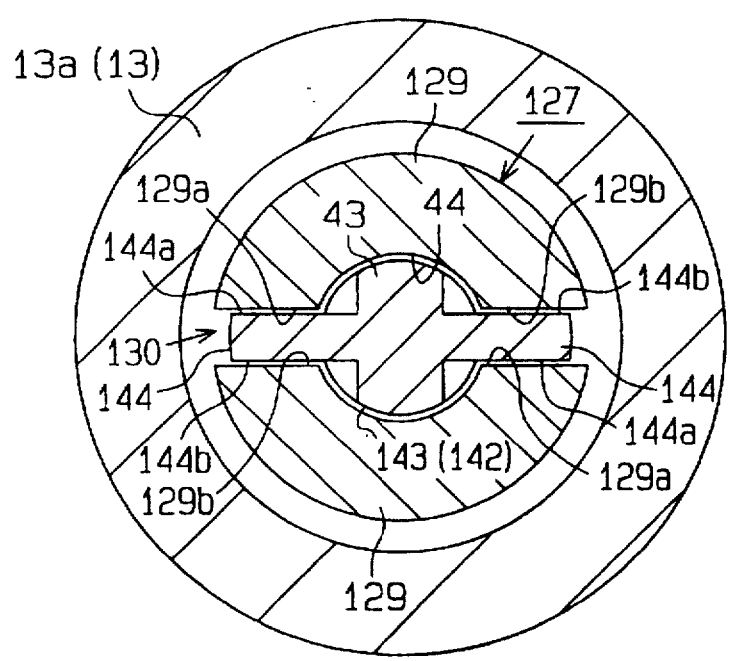
FIG. 11 is an enlarged cross sectional view taken substantially along the line 11—11 of FIG. 10.
Figure 16:
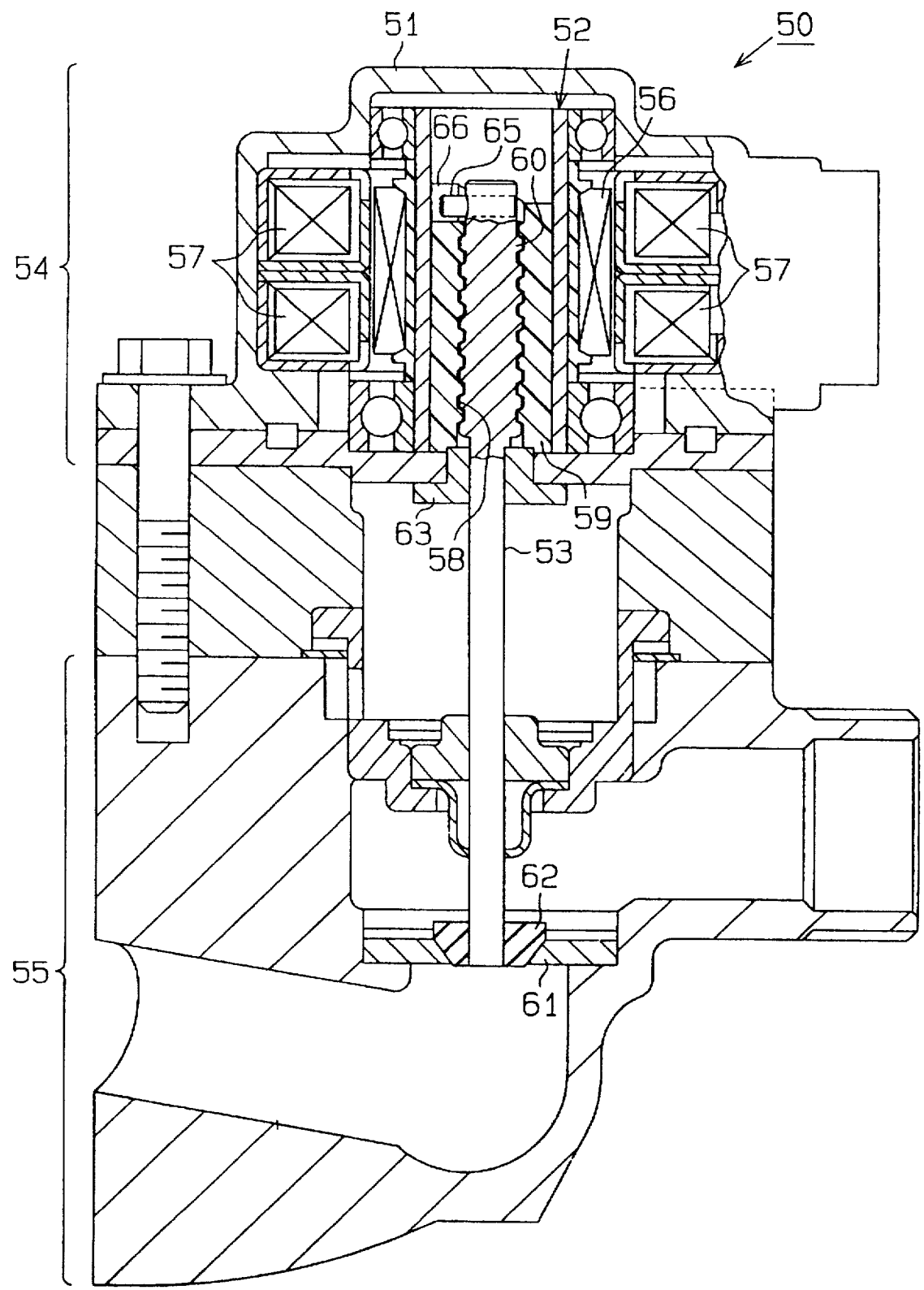
FIG. 16 is an elevational cross-sectional view showing a conventional EGR valve.

Now, the rotation preventing mechanism of a fifth embodiment of the present invention will be described with reference to FIGS. 9 through 11. This embodiment is different in the position of arrangement of the rotation preventing mechanism from the fourth embodiment. As shown in FIGS. 10 and 11, a cover member 13 is integrally formed with an accommodating portion 13a. The accommodating portion 13a has fixed at its opening portion a bearing 122 having a through hole 22a of circular configuration. The axial portion 20a of a screw shaft 142 has a circular cross section. Above the bearing 122, the rotation preventing mechanism 127, which is substantially identical with the rotation preventing mechanism described in the third embodiment, is press fitted into and fixed to the accommodating portion 13a, with a cylindrical projection 129 pointing upward.

Figure 9:
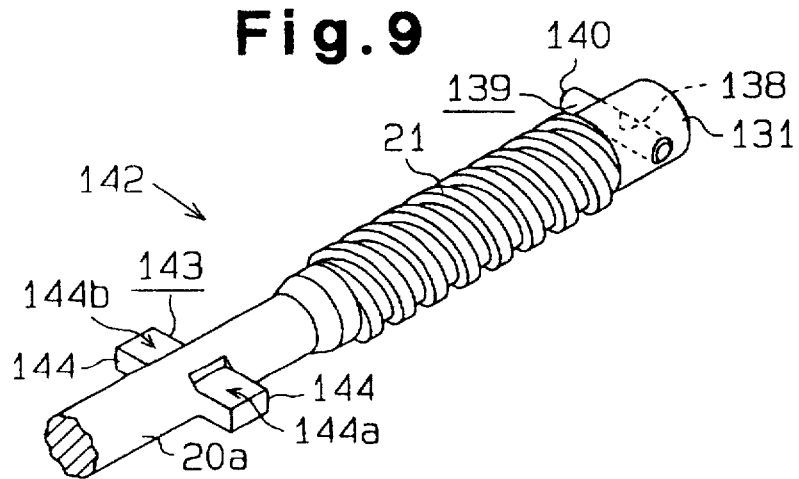
FIG. 9 is a partial perspective view showing a screw shaft of a fifth embodiment of the present invention.

As shown in FIGS. 9 and 11, a pressed portion 143 with two projections 144 is formed in the lower portion of the screw shaft 142 below a male thread portion 21. Each projection 144 is provided with a first surface 144a and a second surface 144b.

One through hole 138 is formed in the upper end 131 of the screw shaft 142. A spring pin 139 shorter than the pin shown in FIG. 6 is fitted into the through hole 138. The projecting end of the spring pin 139 engages with an engaged member 26, thereby setting the reference position of the screw shaft 142 and preventing release thereof.

According to the above-described structure, the first surface 144a and the first guide surface 129a contact at the time of the forward rotation of the rotor 10, and the second surface 144b and the second guide surface 129b contact at the time of the backward rotation of the rotor 10. As a result, the rotation of the screw shaft 142 is stopped.

Now, the rotation preventing mechanism of a sixth embodiment of the present invention will be described with reference to FIG. 12. In this embodiment, a rotation preventing portion 146 and a motor housing 145 are integrally formed with a resin. In the rotation preventing portion 146, a cylindrical projection 129 projects from the inner wall surface of the motor housing 145 downward. Note that the projection 129 is formed with two slits like in the third embodiment.

The motor housing 145 and the rotation preventing portion 146 are integrally formed according to the structure described above, so that the rotation preventing member comprising an oil-containing sintered metal can be omitted. Consequently, the number of parts and the cost are reduced. In addition, since the rotation preventing mechanism is constituted by a combination of the projections 32 of the screw shaft 20 and the projection 129 of the rotation preventing portion 146, which reduces surface pressure, wear or deformation will be reduced even if the rotation preventing portion 146 were made of a resin. This means that the range of choice of materials that can be used in the rotation preventing portion 146 is wider.

In another example shown in FIGS. 13(a) and 13(b), the base portion 40 of a rotation preventing member 149 is provided with a semi-cylindrical projection 150. The projection 150 is provided with a first guide surface 150a and a second guide surface 150b. This rotation preventing member 149 is used in combination with the screw shaft 20 of the third embodiment.

In still another example shown in FIGS. 14(a) and 14(b), a screw shaft 151 is formed with three through holes 138 into which short spring pins 139 are fitted. The end of each spring pin 139 serves as an engagement member 140 having a first engagement portion 140a and a second engagement portion 140b. In a rotation preventing member 152 that is used in combination with the screw shaft 151, only one slit 154 is formed in a cylindrical projection 153. The projection 153 is provided with a first guide surface 153a and a second guide surface 153b.

Note that it is not always necessary that the rotation preventing member be constituted by the cylindrical projection 129. For example, a plurality of vertical pins may be arranged on the base portion 40 at predetermined intervals and the side surface of each pin may be utilized as a guide portion. However, the illustrated embodiments are more advantageous in strength and also from the standpoint of surface contact.

FIG. 15 illustrates a modified rotation preventing member 155. In this rotation preventing member 155, each end face 156c of a projection 156 is inclined in the circumferential direction from a first guide surface 156a to a second guide surface 156b. In this case, when a screw shaft 20 is assembled into the rotation preventing member 155, the projections 32 of the screw shaft 20 are first brought into contact with the end faces 156c. In this state, the screw shaft 20 is rotated in a predetermined direction. Then, the upper ends of the projections 32 are guided along the end faces 156c, and finally, both projections 32 are smoothly inserted into the slits 157 of the projection 156. Therefore, this embodiment, as compared with the third embodiment where the end face of the projection 42 is flat, the assembly of the projection 32 of the screw shaft 20 and the slits 157 of the projection 156 can be made more reliable.

The present invention is not limited to the above-described embodiments where the valve is directly opened and closed by the screw shaft 20, 30, 38, or 46. The invention can be embodied so that the valve can be indirectly opened and closed. Of course, the invention can be embodied in valves other than the EGR valve 1 or 36. Further, the invention can be embodied in various kinds of actuators as well as in valves.

What is claimed is:

1. A motor mounted within a housing, said motor including a stator fixed within said housing and a rotatable cylindrical rotor within said stator and having a female threaded nut formed inside the rotor and a screw shaft having a male threaded length portion threadedly engaged with the female threaded nut, wherein rotation of the rotor is transformed to linear movement of the screw shaft by restricting the rotation of the screw shaft, said motor comprising:

a plurality of engaging projections, including an oppositely projecting pair of engaging projections, carried by and projecting from the screw shaft;

an engagement member provided on the rotor to engage at least one of the engaging projections, said engagement member engaging said at least one of the engaging projections upon rotation of the rotor to a position to establish a longitudinal reference position of the screw shaft with respect to said stator and to prevent the screw shaft from separating from the rotor; and a rotation preventing member attached within said housing and disposed adjacent to said screw shaft to prevent rotation of the screw shaft, said rotation preventing member having a guide surface which engages and guides the longitudinal movement of said oppositely projecting pair of engaging projections during said rotation of the rotor.

2. A motor according to claim 1, wherein at least said pair of engaging projections are formed by swaging an end portion of the screw shaft.

3. A motor according to claim 1, wherein said rotation preventing member is disposed between an inner surface of the housing and the screw shaft.

4. A motor according to claim 3, wherein said rotation preventing member is formed separately from the housing.

5. A motor according to claim 4, wherein said rotation preventing member includes a base section secured to the housing and a projection protruding from the base section, said base section projection having said guide surface.

6. A motor according to claim 5, wherein said projection from the base section has a substantially cylindrical shape and a pair of slits, and wherein said guide surface is formed at each slit.

7. A motor according to claim 6, wherein said engaging projections are capable of making surface to surface contact with the guide surface.

8. A motor according to claim 1, wherein said at least one of the engaging projections consists of said oppositely projecting pair of engaging projections.

9. A motor according to claim 1, wherein said male threaded length portion of said shaft has opposite ends, and said at least one of the engaging projections is adjacent to one of said opposite ends of said male threaded length portion, and said oppositely projecting pair of engaging projections is adjacent to the other of said opposite ends of said male threaded length portion.

* * * * *